US009999988B2

(12) United States Patent
Battis et al.

(10) Patent No.: US 9,999,988 B2
(45) Date of Patent: Jun. 19, 2018

(54) FORMED FIBER COMPOSITE SHEET WITH IMPROVED EDGE DETAIL AND ANTI-BONDING COATINGS FOR MANUFACTURING FIBER COMPOSITE SHEETS

(71) Applicant: JELD-WEN, inc., Klamath Falls, OR (US)

(72) Inventors: Mike T. Battis, Klamath Falls, OR (US); Greg Pickens, Klamath Falls, OR (US)

(73) Assignee: JELD-WEN, Inc., Klamath Falls, OR (US)

( * ) Notice: Subject to any disclaimer, the term of this patent is extended or adjusted under 35 U.S.C. 154(b) by 17 days.

(21) Appl. No.: 14/658,495

(22) Filed: Mar. 16, 2015

(65) Prior Publication Data

US 2015/0184395 A1 Jul. 2, 2015

Related U.S. Application Data

(62) Division of application No. 13/233,394, filed on Sep. 15, 2011, now Pat. No. 8,992,809.
(Continued)

(51) Int. Cl.
*B32B 3/10* (2006.01)
*B27N 3/04* (2006.01)
(Continued)

(52) U.S. Cl.
CPC ................. *B27N 3/04* (2013.01); *B27N 3/00* (2013.01); *B27N 3/083* (2013.01); *E04F 13/075* (2013.01); *Y10T 428/24777* (2015.01)

(58) Field of Classification Search
None
See application file for complete search history.

(56) References Cited

U.S. PATENT DOCUMENTS 3,894,572 A 7/1975 Moore, Jr.
4,217,935 A * 8/1980 Grendelman .......... F16L 33/28 138/109
(Continued)

FOREIGN PATENT DOCUMENTS

CN 101445677 A 6/2009
EP 0989199 A1 3/2000
(Continued)

OTHER PUBLICATIONS

Korean Intellectual Property Office, International Search Report and Written Opinion, International Patent Application No. PCT/US2011/051722, dated Mar. 16, 2012, 11 pages.
(Continued)

*Primary Examiner* — Christopher Polley
(74) *Attorney, Agent, or Firm* — Stoel Rives LLP

(57) ABSTRACT

Methods and systems for forming a thin-layer moisture-resistant fiber composite material involve pressing a mixture of fibers and resin between a pair of heated dies at least one of which includes a working surface coated with a hard ormosil coating including a cross-linked organically-modified silica network. The use of such coatings may yield composite sheet materials having improved surface quality, sharper edges, and greater draw angles than previously possible. Some systems for making thin-layer fiber composite materials may utilize ormosil coatings on various working surfaces of equipment coming into contact with the fiber and resin mixture, such as surfaces of machinery for mixing or conveying the mixture to the dies.

17 Claims, 4 Drawing Sheets

Related U.S. Application Data

(60) Provisional application No. 61/383,297, filed on Sep. 15, 2010.

(51) Int. Cl.

| | |
|---|---|
| ***B27N 3/00*** | (2006.01) |
| ***B27N 3/08*** | (2006.01) |
| ***E04F 13/075*** | (2006.01) |

(56) References Cited

U.S. PATENT DOCUMENTS

| | | | | |
|---|---|---|---|---|
| 5,432,007 | A | 7/1995 | Naito | |
| 5,691,067 | A | 11/1997 | Patel | |
| 6,077,341 | A | 6/2000 | Terase et al. | |
| 6,534,176 | B2 | 3/2003 | Terase et al. | |
| 6,749,945 | B2 | 6/2004 | Knobbe et al. | |
| 6,887,420 | B2 | 5/2005 | Heilig et al. | |
| 7,022,414 | B2 * | 4/2006 | Davina | B27N 3/08 264/119 |
| 7,022,416 | B2 | 4/2006 | Teranishi | |
| 7,105,598 | B2 | 9/2006 | Terry et al. | |
| 7,157,147 | B2 | 1/2007 | Inui et al. | |
| 7,316,919 | B2 | 1/2008 | Childs et al. | |
| 7,390,447 | B1 | 6/2008 | Clark et al. | |
| 7,399,438 | B2 | 7/2008 | Clark et al. | |
| 7,481,900 | B1 * | 1/2009 | Quinif | E06B 3/7001 156/196 |
| 7,691,912 | B2 | 4/2010 | Ou et al. | |
| 7,727,637 | B2 | 6/2010 | Park | |
| 7,765,768 | B2 | 8/2010 | Liang et al. | |
| 7,879,449 | B2 | 2/2011 | Jeon et al. | |
| 2002/0109249 | A1 | 8/2002 | Klug et al. | |
| 2003/0073799 | A1 | 4/2003 | Frick et al. | |
| 2004/0230022 | A1 | 11/2004 | Harris et al. | |
| 2005/0266222 | A1 | 12/2005 | Clark et al. | |
| 2006/0263587 | A1 | 11/2006 | Ou et al. | |
| 2006/0272247 | A1 * | 12/2006 | Bartlett | E06B 3/88 52/232 |
| 2008/0119347 | A1 | 5/2008 | Sturgis et al. | |
| 2008/0269393 | A1 | 10/2008 | Bate et al. | |
| 2010/0120312 | A1 | 5/2010 | Xin et al. | |
| 2011/0039682 | A1 | 2/2011 | Han et al. | |
| 2011/0180546 | A1 | 7/2011 | Le Bris et al. | |

FOREIGN PATENT DOCUMENTS

| | | | |
|---|---|---|---|
| EP | 1835002 | A2 | 9/2007 |
| EP | 2177580 | A1 | 4/2010 |
| JP | 2000144116 | A | 5/2000 |
| KR | 100732085 | B1 | 6/2007 |
| KR | 100865966 | B1 | 10/2008 |
| KR | 100871877 | B1 | 12/2008 |
| KR | 20100002074 | A | 1/2010 |
| KR | 20100004798 | A | 1/2010 |
| KR | 20100005484 | A | 1/2010 |
| KR | 20100008934 | A | 1/2010 |
| WO | WO 2004/076141 | A2 | 9/2004 |
| WO | WO 2008/075815 | A1 | 6/2008 |

OTHER PUBLICATIONS

K. A. Mauritz, Sol-Gel Chemistry, available at least as early as Sep. 15, 2010, last visited Aug. 6, 2012, 7 pages.

Minglin MA, Randal M. Hill, Superhydrophobic Surfaces, Journal of Colloid & Interface Science, vol. 11, Oct. 11, 2006, pp. 193-202.

S. Giessler, E. Just, R. Störger, Easy-to-Clean Properties—Just a Temporary Appearance?, Thin Solid Films vol. 502, Aug. 18, 2005, pp. 252-256.

H.M. Shang, Y. Wang, S.J. Limmer, T.P. Chou, K. Kakahashi, G.Z. Cao, Optically Transparent Superhydrophobic Silica-Based Films, Thin Solid Films vol. 472 Apr. 16, 2004, pp. 37-43.

Terho Kololuoma, Preparation of Multifunctional Coating Materials and Their Applications, Sep. 5, 2003, 7 pages.

F. Mammeri, E. Le Bourhis, L. Rozes, C. Sanchez, Mechanical Properties of Hybrid Materials, Journal of Materials Chemistry, vol. 15, Issue 35-36, 2005, 10 pages.

A. Venkateswara Rao, Sharad D. Bhagat, Hiroshi Hirashima, G.M. Pajonk, Synthesis of Flexible Silica Aerogels Using Methyltrimethoxysilane (MTMS) Precursor, Journal of Colloid & Interface Science, vol. 300, Mar. 19, 2006, pp. 279-285.

Gerald L. Witucki, A Silane Primer: Chemistry and Applications of Alkoxy Silanes, Oct. 21, 1992, 4 pages.

R. Giles Dillingham, Brietta R. Oakley, Drew Gilpin, Wetting Measurements for Identification of Specific Functional Groups Responsible for Adhesion, Journal of Adhesion, vol. 84, Oct. 16, 2008, pp. 1007-1022.

Hoy Yul Park, Dong Pil Kang, Moon Kyong NA, Hee Woong Lee, Hyeon Hwa Lee, Dong Soo Shin, Characteristics of Organic-Inorganic Hybrid Coating Films Synthesized from Colloidal Silica-Silane Sol, J. Electroceram, vol. 22 (2009), Nov. 13, 2007, pp. 309-314.

Dr. Christopher H. Phillips, Technical Information: Thermolon™ Mineral Coatings, May 2010, 33 pages.

Dr. Sabine Giessler, SIVO® Clear: Safety Through Perfect Visibility Under All Conditions, Jun. 23, 2004, 24 pages.

Sivento Silanes, Product Information: SIVO® Clear, available at least as early as Sep. 15, 2010, 2 pages.

Degussa, SIVO®Clear K1 Safety Data Sheet, Jan. 18, 2005, 8 pages.

Degussa, SIVO®Clear K2 Safety Data Sheet, Feb. 19, 2005, 8 pages.

Thermolon, http://thermolon.com/applications/industrial-uses, last visited Jun. 16, 2010, 2 pages.

Cerasol, www.cerasol.com.hk/product_4a.html, last visited Sep. 13, 2010, 1 page.

Cerasol, www.cerasol.com.hk/product_1.html, last visited Sep. 13, 2010, 1 page.

Cerasol, www.cerasol.com.hk/product_4c.html, last visited Sep. 14, 2010, 12 pages.

Ilag, http://www.ilag-ag.com/cms2/site/user/index.php-?page_id=254, last visited Sep. 9, 2010, 13 pages.

Whitford, The New Line of Improved Ceramic Nonstick Coatings from Whitford, Apr. 2010, 14 pages.

Whitford, Temporary Data Sheet, May 20, 2009, 9 pages.

Ceratech Ceralon, Green-Effect Technology, last visited Sep. 13, 2010, 12 pages.

Nagaraja D. Hegde, A. Venkateswara Rao, Physical Properties of Methyltrimethoxysilane Based Elastic Silica Aerogels Prepared by the Two-Stage Sol-Gel Process, J. Mater. Sci., vol. 42, Apr. 26, 2007, pp. 6965-6971.

Digambar Y. Nadargi, Sanjay S. Latthe, A. Venkateswara Rao, Effect of Post-Treatment (Gel Aging) on the Properties of Methyltrimethoxysilane Based Silica Aerogels Prepared by Two-Step Sol-Gel Process, Journal of Sol-Gel Science and Technology, vol. 49, Issue 1 (2009), Sep. 17, 2008, pp. 53-59.

Feng Wang, Polydimethylsiloxane Modification of Segmented Thermoplastic Polyurethanes and Polyureas, Dissertation Submitted to Virginia Polytechnic Institute and State University, Apr. 13, 2008, 244 pages.

* cited by examiner

FORMED FIBER COMPOSITE SHEET WITH IMPROVED EDGE DETAIL AND ANTI-BONDING COATINGS FOR MANUFACTURING FIBER COMPOSITE SHEETS

RELATED APPLICATIONS

This application is a divisional of and claims the benefit under 35 U.S.C. § 120 from U.S. patent application Ser. No. 13/233,394, filed Sep. 15, 2011, which claims the benefit under 35 U.S.C. § 119(e) of U.S. Provisional Application No. 61/383,297, filed Sep. 15, 2010, the disclosures of which are incorporated herein by reference.

TECHNICAL FIELD

The field of this application relates generally to the manufacture of thin-layer composites and, more particularly but not exclusively, to composite door skins made from an isocyanate-based resin and cellulosic and/or noncellulosic fibers.

BACKGROUND

U.S. Pat. No. 7,399,438 of Clark et al., which is incorporated herein by reference, describes methods of manufacturing lignocellulosic composite materials and doors made of a frame structure covered by thin-layers of such composite materials known as door skins. The composite materials and door skins may be made by mixing wood fiber, wax, and a resin binder, and then pressing the mixture under conditions of elevated temperature and pressure to form a thin-layer wood composite that is then bonded to the underlying door frame or core. As described in the '438 patent, composite door skins are conventionally formed by pressing wood fragments between heated dies in the presence of a binder at temperatures exceeding 275° F. (135° C.). The resin binder used in the door skin may be an isocyanate-based resin, a formaldehyde-based resin, a thermoplastic resin, or a thermoset resin.

A significant problem in the manufacture of wood-based composite products that are exposed to the outdoor environment and extreme interior environments is that upon exposure to variations in temperature and moisture, the wood can lose water and shrink, or gain water and swell. This tendency to shrink and/or swell can significantly limit the useful lifetime of most exterior wood products, such as wooden doors, often necessitating replacement after only a few years. The problem is particularly prevalent in extremely wet climates and extremely hot or dry climates. Door skins made of a composite mixture of wood fibers, fiberglass, and a resin binder have recently been introduced in the market, which provide improved resistance to moisture. Composite materials and door skins made of fiberglass and resin and without any cellulosic fiber content are also known.

The '438 patent describes a process utilizing isocyanate-based resins instead of formaldehyde-based resins to yield lignocellulosic fiber composite door skins having increased resistance to changes in environmental moisture. Isocyanate-based resins may also provide environmental benefits over formaldehyde-based resins. However, the present inventors have found that it is more difficult in some respects to make composites with isocyanate-based resins than with formaldehyde-based resins. For example, isocyanate-based resins have a greater tendency to adhere to the working surfaces of the steel dies used for pressing the composite mixture. This tendency can lead to a build-up of resin or composite material on the die surface, which causes undesirable defects in the surface finish of door skins.

The '438 patent describes several generally complementary approaches to inhibiting adhesion and build-up on die surfaces, including the use of an internal release agent in the composite mixture, the application of a release agent on the surface of a mat of the composite mixture prior to pressing the mat, and the application of anti-bonding agents on the die surface. Some of the various anti-bonding agents described in the '438 patent involve coating the die surface with a liquid composition that is baked into the die to form a stable anti-bonding coating that can be used for 2000 press cycles. The '438 patent also describes that the use of a release agent and/or an anti-bonding agent during the manufacture of cellulosic composite door skins may allow for increased resin content in the composite, which may improve the strength and surface finish of door skins. Notwithstanding the use of anti-bonding agents on the dies and release agents in or on the composite mixture, a build-up will eventually form on the dies over the course of many successive pressing cycles, requiring the dies to be regularly removed from the press for cleaning and recoating with the anti-bonding agent. Removal and recoating of the dies leads to equipment downtime, added expense, and waste.

Accordingly, a need exists for improved means and methods of preventing composite adhesion to and build-up on the dies used for pressing door skins and other composite materials.

SUMMARY

A method of forming a thin-layer moisture-resistant fiber composite material such as a door skin involves forming a loose mat from a mixture of fibers and at least 1% by weight of resin such as an organic isocyanate resin, then pressing the mat between a pair of heated dies at least one of which includes a working surface coated with a hard ormosil coating. The ormosil coating preferably includes a cross-linked organically-modified silica network and has a hardness exceeding 6H pencil hardness. The dies may be heated to between 250° F. and 425° F. (121° C. to 218° C.), such that when the mat is pressed for sufficient time, e.g. greater than 15 seconds at more than 100 psi (690 kPa), the resin interacts with the fibers to form a consolidated fiber composite sheet material having a thickness in the range of about 1 mm to 13 mm.

The hard ormosil coating may be characterized by a dry film thickness of approximately 25 to 80 microns (micrometers (μm)) or more, abrasion resistance greater than 50,000 cycles (BSI Standard 7069:1988) and scratch resistance of at least 12 grams critical load using a 90° diamond indenter, and may allow the composite sheet forming process to be repeated for 20,000 cycles without substantially degrading an anti-bonding property of the ormosil coating. In some embodiments, the ormosil coating includes inorganic additives, such as metal oxide particles or nanoparticles dispersed within the silica network. In some embodiments, the ormosil coating includes alkyl or aryl groups chemically bonded to the silica network, which may result in the coating being hydrophobic so as to exhibit an advancing water contact angle of greater than 90 degrees and a total surface energy of less than approximately 25 mJ/m2, including a polar surface energy component of less than approximately 6 mJ/m2.

The ormosil coating may be formed by a sol-gel process in which an admixture of at least two distinct reactive chemical components is matured before being applied to the die and cured, preferably by heating the coated die to an increased temperature, in the range of 385° F. to 660° F. (196° C. to 349° C.) for example. To promote coating adhesion, the die working surface is preferably roughened to approximately 2.5 to 6.0 microns (μm) Ra before the ormosil coating is applied thereto.

Systems for manufacturing a thin-layer moisture-resistant fiber composite material from a mixture of cellulosic fibers and resin are also disclosed, in which a metallic working surface of equipment that is exposed to the mixture during processing is coated with the above-described ormosil coating to thereby inhibit buildup of the resin and fibers on the working surface. The equipment may include a pair of dies that are heated to between 250° F. and 425° F. (121° C. and 218° C.), at least one of which is coated with the ormosil coating, or other equipment in the system, such as a blender, blowline piping, a refiner, or a conveyor belt for example.

Use of the ormosil coatings described herein may yield composite sheet material products having improved surface quality, edge sharpness, and/or increased draw angles, or other benefits.

Further aspects of various embodiments will be apparent from the following detailed description which proceeds with reference to the accompanying drawings.

DETAILED DESCRIPTION OF PREFERRED EMBODIMENTS

As used herein, a thin-layer composite comprises a sheet or generally flat composite structure that is significantly longer and wider than it is thick. Examples of thin-layer composites include door skins that are used to cover the frame or core of a door to provide the outer surface of the door. Such door skins may comprise composite sheets that are only about 1 to about 13 mm thick, but may have a surface area of about 10-24 square feet (about 0.9 to 22 square meters) or more. Door skins may be flat and smooth or may be contoured to simulate a frame-and-panel construction and/or textured to simulate natural wood grain. Other thin-layer cellulosic composite products include medium density fiberboard (MDF), hardboard, particleboard, oriented strand board (OSB) and other composite panel products reinforced with wood chips, wood fibers, or other cellulosic fibers. These composite products may be made in sheets ranging in thickness from about 2 mm to about 30 mm.

Figure 1:
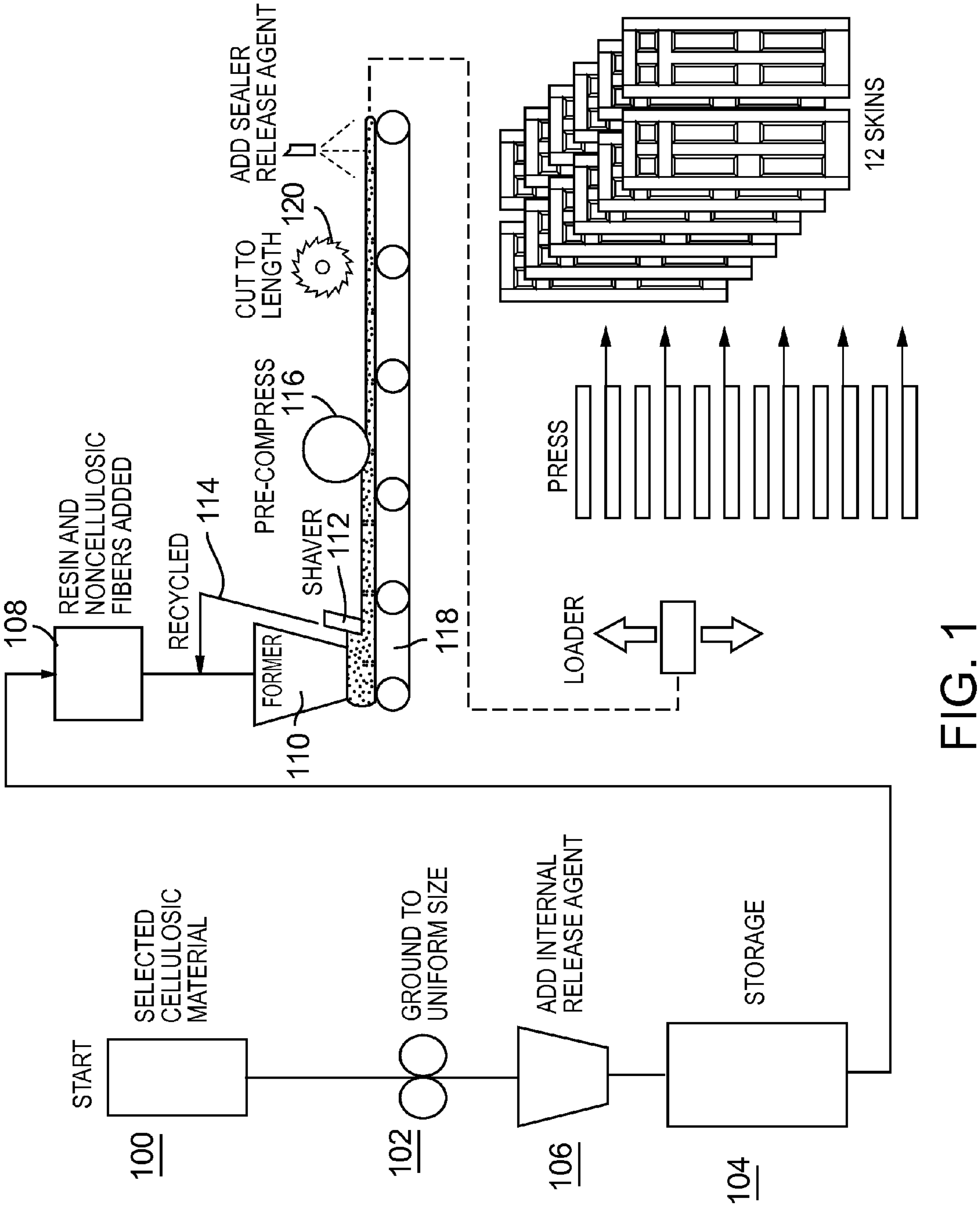
FIG. 1 is a simplified process flow diagram showing exemplary manufacturing steps for making thin-layer composites, such as a door skins.

FIG. 1 illustrates an overview of exemplary manufacturing steps for making thin-layer cellulosic composite door skins. Generally, wood chips may serve as a selected cellulosic starting material. The wood chips may be ground, or refined, to prepare fibers of a substantially uniform size and an appropriate amount of an optional release agent may be added. A wax may also be added. A catalyst such as a polyol or amine may also be added. After refining, the cellulosic fibers may be dried to a specific moisture content or to within a specific moisture content range, such as from about 4% to about 20% by weight, wherein moisture content=[(weight of fibers−oven dry weight)÷oven dry weight]×100. In some embodiments, however, no significant dehydrating or drying of the cellulosic fiber is necessary prior to treatment with a resin. At this point, the material may be stored until further processing. In some embodiments, noncellulosic fibers such as mineral fibers or fiberglass may be added to the refined cellulosic fiber material.

In still other embodiments, noncellulosic fibers may be used instead of refined cellulosic fiber material. Fiber-reinforced composite materials that do not include cellulosic fibers include fiberglass composites made from sheet molding compound (SMC) or bulk molding compound (BMC) including a polyester resin, or by a process known as long-fiber injection (LFI) using a polyurethane resin. LFI composites are useful for making building materials, including door skins, as described in U.S. patent application Ser. No. 11/112,540, filed Apr. 21, 2005, and published as US 2006-0266222 A1, which is incorporated herein by reference.

As shown at process station 108, the fibers (whether cellulosic, noncellulosic, or both) are mixed with an appropriate binder resin, and optionally one or more of a catalyst, a wax, an internal release agent, a tackifier, a filler and/or other additives, until a uniform composite mixture is formed. Alternatively, the resin may be added to the cellulosic fiber prior to addition of noncellulosic fibers. The composite mixture may then be formed by former 110 into a loose mat which is modified to the desired thickness by using a shave-off roller 112 and pre-compressed by a roller 116 or some other pressing mechanism to a density of about 3 to about 12 pounds per cubic foot. While the mat moves along a conveyor 118, a trimmer 120, such as a flying saw, trims the pre-compressed mat into segments sized to fit within the press, after which a release agent may optionally be applied to the top surface of the mat segments. The pre-compressed mat segments are then loaded into a platen press, and compressed between two dies under conditions of increased temperature and pressure. For example, pressing conditions may comprise pressing the mat for about 15 seconds between dies heated to about 300° F. (about 149° C.), which apply pressure to the mat in the range of about 600-850 psi (about 42.2-59.8 kg/$cm^2$), followed by about 30 seconds of a lower applied pressure of about 100-300 psi (about 7.0-21.1 kg/$cm^2$). In some embodiments, the dies are heated to a higher temperature of approximately 400° F. or more, to accelerate the curing process. In some embodiments, the mat is pressed between the heated dies at greater than 100 psi for at least 15 seconds, and in other embodiments at greater than 250 psi for at least 15 seconds, e.g., perhaps 30 seconds or more. Generally, a recessed (female)

die is used to produce the inner surface of the door skin (facing the door frame or core), and a male die shaped as the mirror image of the female die is used to produce the outside surface of the skin. The dies may include surface contours to create a paneled appearance and simulated sticking in the door skin. In some embodiments, the male die may include a surface texture that forms a wood grain pattern in the surface of the door skin. After pressing, the door skin is removed from the press, cooled, and optionally sized, primed, and humidified. The resulting thin-layer composite door skin is mounted onto a door frame or core using an adhesive and employing methods well known in the art.

Figures 2A, 2B, 2C, 2D, 2E:
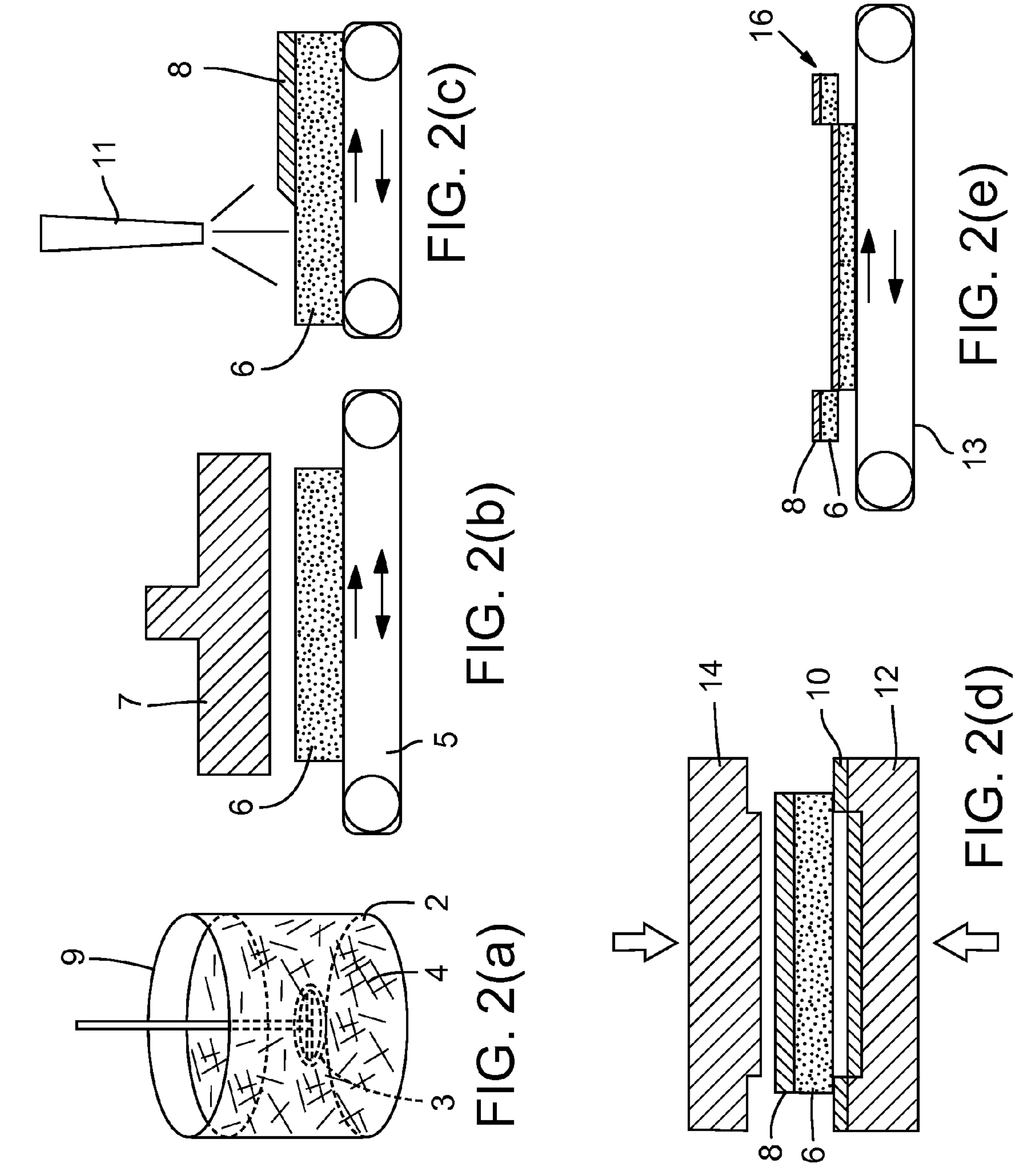
FIGS. 2(*a*)-2(*e*) are diagrams showing exemplary manufacturing steps for making the thin-layer composites, including (a) mixing fiber and resin to form a composite mixture; (b) forming the composite mixture into a loose mat; (c) optional spraying of the loose mat with release agent; (d) pressing the mat between two dies; and (e) releasing the resultant thin-layered composite product from the dies.

FIGS. 2(*a*)-2(*e*) illustrate individual steps in the method for making a thin-layer composite. FIG. 2(*a*) illustrates the step of forming a composite mixture 2 including reinforcing fibers 4, such as refined cellulosic fibers and/or fiberglass, and a resin (not labeled), such as at least about 1% by weight of an organic isocyanate resin, such as polymeric diphenylmethane diisocyanate (pMDI), or between 1.5% and 8% by weight pMDI resin (based on oven dry weight of the fibers). In one embodiment, the mixture includes 60-95% weight refined cellulosic fibers and between 1.5% and 7% wt of the organic isocyanate resin. In other embodiments a different resin, such as a phenol-formaldehyde resin, may be used. Optionally, an internal release agent, catalyst, wax, fillers and/or additives may be added to the mixture 2. In some embodiments, the mixture 2 may be prepared using blowline blending of the resin, fibers, and any other ingredients. Alternatively, a blender 9 having a means for mixing 3 such as a paddle, devil-toothed plates, attrition plates, fluted plates, pin rolls, refining plates, or the like, may be used. The cellulosic and/or noncellulosic fibers, resin, and other ingredients may be mixed in the blender 9 for a set time until the mixture is uniform. The uniform mixture is then conveyed to a former box 110 (FIG. 1). The mixture may be conveyed by mechanical means, dropped by gravity, or carried by positive pressure or vacuum suction out of the blender 9 and to the former box 110. The former box 110 preferably shapes the composite mixture into a loose mat on the surface of a moving conveyor belt 118, 5. The loose mat may be modified to the desired thickness by using a shaver 112 (FIG. 1). In some embodiments, the shaver 112 is a shave-off roller. The shave-off roller may have small teeth or bristles that help convey excess material to a recycling loop 114. Without being tied to theory, the teeth or bristles may also help to align fibers on or near the surface of the mat to lie generally parallel to the plane of the surface of the mat.

With reference to FIG. 2(*b*), the loose mat is then preferably pre-pressed to reduce its thickness by between 40% and 75% to form a pre-compressed mat 6. The pre-pressing compression may be achieved by a roller 116 (FIG. 1) or belt (not shown) mounted at a fixed distance above a conveyor belt 5 that transports the mat between equipment stations, or by some other type of pre-press 7, illustrated schematically in FIG. 2(*b*). The density of the compressed mat 6 may vary depending on the nature of the wood composite being formed, but generally, the mat is formed and compressed or "pre-pressed" to have a density of about 3 to about 12 pounds per cubic foot (i.e., 48-192 kg per cubic meter). Turning to FIG. 2(*c*), after trimming the mat into segments sized to fit in the press dies 12 and 14 (FIG. 2(*d*)), a release agent 8 may optionally be applied to a surface of the mat 6 by spraying using a spinning disc applicator, spray nozzles, or by another method and release agent application means 11. The release agent may comprise an aqueous solution of compounds, monomers, or polymers. In some embodiments, the release agent may contain fatty acids, and in other embodiments may contain an emulsion of surfactant and/or polymer, such as silicone. One suitable release agent is Aquacer 549. Another release agent is Michelmann's Ad9897.

With reference to FIG. 2(*d*), the mat 6 may then be loaded into a press between a female die 12 and a male die 14, and pressed at an elevated temperature and pressure and for a sufficient time to further reduce the thickness of the thin-layer composite and promote interaction between the resin and the fibers. In the case of isocyanate-based resin, it is believed that heating causes the isocyanate of the resin to form a urethane or polyurea linkage with hydroxyl groups of the cellulose. Modification of the hydroxyl groups of the cellulose with the urethane linkage prevents water from hydrating or being lost from the cellulose hydroxyl groups. With reference to FIG. 2(*e*), upon curing of the resin, a door skin 16 having a resistance to moisture is formed and thereafter removed from the dies.

Exemplary fibers, resins, release agents, waxes, catalysts, additives and other ingredients of the composite mixture, as well as parameters for and variations on methods of manufacture and composite materials made thereby, are described in further detail in U.S. Pat. No. 7,399,438 of Clark et al., issued Jul. 15, 2008; in U.S. Patent Application Publication No. US 2006/0266222 A1, published Dec. 1, 2005; and in U.S. Provisional Patent Application No. 61/355,934, filed Jun. 17, 2010, all of which are incorporated herein by reference for the disclosure of such details.

As described above, in certain embodiments, one or both of the dies 12, 14 may be coated with an anti-bonding agent. FIG. 2(*d*) illustrates an embodiment in which the pressing surface of the female die 12 facing male die 14 is coated with an anti-bonding agent 10, but male die 14 is not coated with the anti-bonding agent. In some embodiments, pressing surfaces of both dies 12 and 14 are coated with an anti-bonding agent. In an alternative embodiment, the method of making composite material may employ a release agent 8 sprayed on the surface of the mat 6, with or without the use of an anti-bonding coating on dies 12 and 14. In still other embodiments, the method may employ an internal release agent blended in with the resin and fiber mixture forming the mat, without using an anti-bonding coating on the dies 12 and 14. After it is pressed, the door skin is removed from the dies 12 and 14 (FIG. 2(*d*)), conveyed by payoff conveyor 13 (FIG. 2(*e*)), and allowed to cool while it is transported for further processing (sizing, priming, and/or humidifying) prior to being assembled into a completed door.

In accordance with an embodiment, the anti-bonding agent may include a hard anti-bonding coating that is abrasion resistant and that will not degrade at temperatures achieved at the die surface or after many thousands of cycles between the peak temperature and lower operating temperatures. The peak temperatures achieved at the die surfaces may approach or exceed the 280-425° F. nominal operating temperature of the heated dies due to applied pressure and other factors. An exemplary anti-bonding coating may have a dry film thickness (DFT) of approximately 40 microns (μm) and an abrasion resistance of greater than 50,000 cycles, as measured using a standard reciprocal abrasion test for cookware—BSI Standard No. BS 7069:1988, with a 4.5 kg force and 3M 7447 Scotch-Brite abrasive pad. In one embodiment, the anti-bonding coating may have a pencil hardness exceeding 6H. Other embodiments of the anti-bonding coating may have a pencil hardness exceeding 7H or 8H. In some embodiments, the anti-bonding coating may have a pencil hardness exceeding 9H. In still another embodiment, the anti-bonding coating may have a hardness exceeding 5 on the Mohs scale. In yet another embodiment, the anti-bonding coating may have a hardness exceeding 6 or 7 on the Mohs scale. The anti-bonding coating may have a scratch resistance and/or adhesion sufficient to withstand critical scratch loads in excess of 6, 8, 10, 12, 14, 16, 18, or 20 grams using a 90° diamond indenter stylus pressed with progressively increasing loads against the coated substrate which is moved via a movable stage at a constant rate, wherein the critical load to failure is the load at which the coating is breached and the indenter reaches the substrate surface. In addition to excellent abrasion resistance and/or hardness, embodiments of the anti-bonding coating may comprise a vitreous material having chemically bonded alkyl groups and/or aryl groups with hydrophobic properties that withstand more than 4000 pressing cycles, and preferably more than 10,000 pressing cycles, at the 280-425° F. nominal operating temperature. Some embodiments of the anti-bonding coatings may retain their hydrophobic and/or anti-bonding properties after more than 20,000, 30,000, 40,000 or 50,000 press cycles of a process for making fiber-reinforced composites using pMDI resin. In other words, in some embodiments the press may be cycled more than 20,000 times to make more than 20,000 sheets of composite materials, such as >20,000 door skin master panels, without substantially degrading an anti-bonding property of the anti-bonding coating as determined by measurement of contact angles (ASTM D7334-08) to determine surface energy, which should not increase more than 10%. The use of a vitreous material such as modified silica may provide for enhanced adhesion of the anti-bonding coating to the die surface and strong chemical bonding of alkyl and/or aryl groups with the network. The die may preferably be made of a steel containing at least some silica to promote adhesion.

In accordance with an embodiment, the anti-bonding agent is a hard PTFE-free non-stick coating. Some such coatings are applied via a sol-gel technique to form a ceramic or ceramic-like matrix, or a cross-linked network having excellent hardness and abrasion resistance. In some embodiments, the anti-bonding coating is organically modified silica (ormosil). In other embodiments, the anti-bonding coating comprises a silica network modified with organic and inorganic components (an organic-inorganic hybrid). Anti-bonding coatings applied by the sol-gel technique include coatings offered by Whitford Worldwide Co. of Elverson, Pa., USA under the trade name FUSION; by Thermolon Ltd. of Hong Kong under the trade names ROCKS, ENDURANCE, FLEXITY, and RESILIENCE; by Ceratech Co., Ltd. of Busan, Korea under the trade names CT-100, CT-200, CT-600, CT-700, and CT-800; and by ILAG Industrielack AG of Lachen, Switzerland under the trade names CERALON and ILASOL. The Thermolon, Ceratech and ILAG coatings are advertised to comprise a ceramic matrix including primarily silicon and oxygen (i.e., silica ($SiO_2$)), modified with relatively small amounts of other inorganic materials and pigment.

Other anti-bonding coatings include ceramic coatings applied from a liquid solution including a volatile solvent, such as CERAKOTE Press Release coatings offered by NIC Industries, Inc. of White City, Oreg., and dry powdered coating materials applied by a plasma spray process to form a hard ceramic coating.

Some embodiments of the anti-bonding coating may comprise a ceramic matrix or network including primarily silicon and oxygen (i.e., silica ($SiO_2$)), modified with a metal oxide, metal hydride, alkaline earth metals, and/or lanthanoid. In one embodiment, the silica network is modified with alkyl groups and an inorganic pigment, and relatively small amounts (0.1% to 5.0%) of alumina ($Al_2O_3$) and/or titania ($TiO_2$) particles or nanoparticles dispersed within the silica network. In another embodiment, the silica network is further modified with particles or nanoparticles of copper chromite black spinel and/or manganese dioxide ($MnO_2$) dispersed within the silica network. The modified silica may be characterized as a polysiloxane or a polysilsesquioxane. In some embodiments, the silica network is modified with an organic non-polar molecule, such as alkyl groups or aryl groups, so as to have a very low surface energy. In one embodiment, the organic modifier includes methyl groups. In another embodiment, the organic modifier forms polydimethylsiloxane (PDMS). In some embodiments, the anti-bonding agent is substantially free of fluorine.

Some embodiments of an organic-inorganic hybrid silica used in the anti-bonding coating may include functional additives. Functional additives may include pulverized, powdered, or nano-particulate natural stone materials or minerals, such as quartz, monzonite, gneiss, rhyolitic tuff, tourmaline, obsidian, or lava, and ion-exchange materials such as strontium, vanadium, zirconium, cerium, neodymium, lanthanum, barium, rubidium, cesium or gallium.

Figure 3:
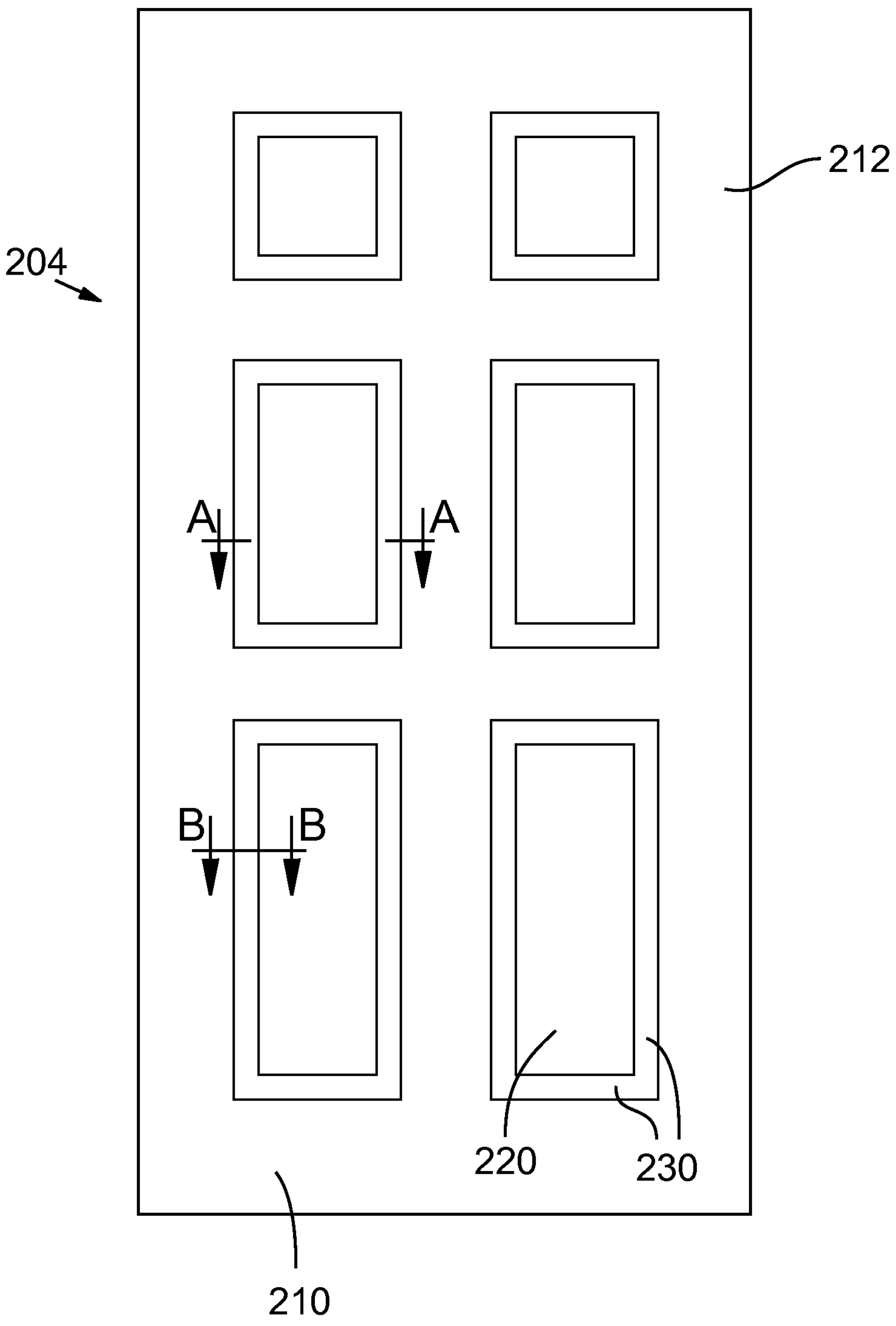
FIG. 3 is a top view of a female die (bottom die) of a die set shown in cross section in FIG. 4.
Figure 4:
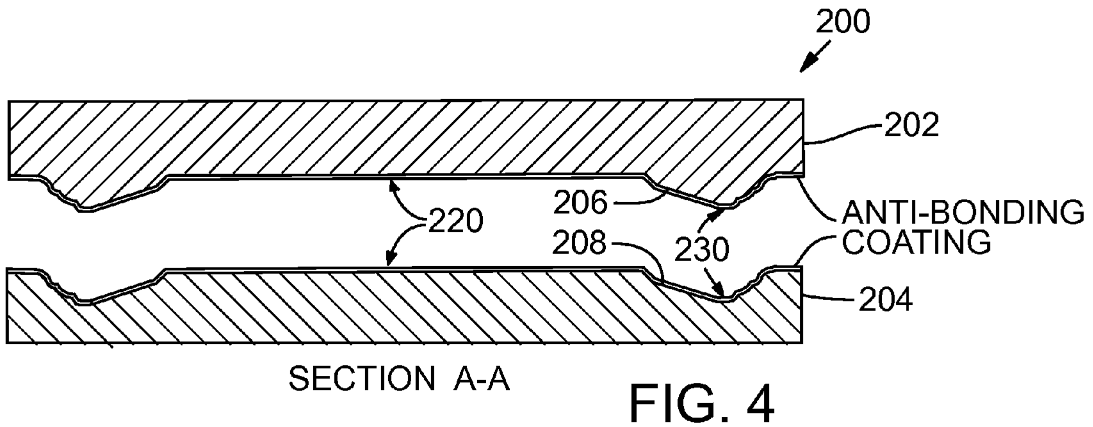
FIG. 4 is an enlarged cross-section view of a die set for pressing door skins, taken along line A-A of FIG. 3, illustrating details of the die and an anti-bonding coating thereon.
Figure 5:
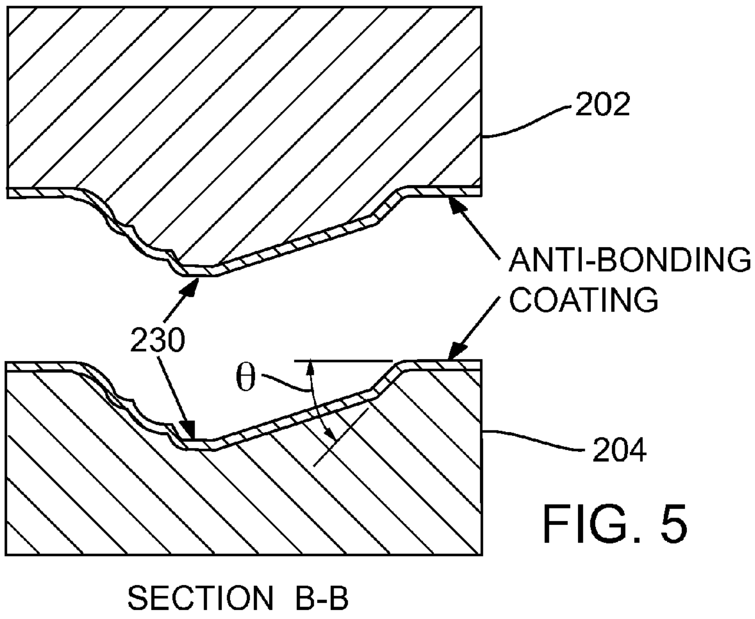
FIG. 5 is an enlarged cross-section view of the die of FIGS. 3 and 4 taken along line B-B of FIG. 3, showing detail of the sticking.

FIG. 4 illustrates a cross-section view of a portion of a forming die 200 (taken along line A-A of FIG. 3) for pressing and curing a composite mixture to form a door skin 300 (FIG. 6) according to an exemplary embodiment, including a male die 202 and an opposing female die 204. Dies 202, 204 include contoured working surfaces 206, 208 that are approximately the mirror image of each other for forming a contoured profile in door skins to simulate the appearance of a traditional frame-and-panel construction (also known as rail-and-stile construction). The contoured profile of dies 202, 204 include portions shaped to form simulated rails and stiles 210 and 212 (FIG. 3), simulated panels 220 and simulated sticking 230 therebetween (see sticking 304 in FIG. 6). One or both of the working surfaces 206, 208 may be textured to impart a simulated wood grain appearance to door skins. Dies 202 and 204 may each be between approximately 2 and 4 inches thick and typically slightly larger in length and width than one or two residential doors (depending on whether the die is sized to form a single door skin or two doorskins) or garage door panels, i.e., approximately 1 to 8 feet wide, and approximately 6 to 18 feet long (tall). Dies 202 and 204 are preferably made of tool steel, such as Kleen-Kut 45 or Industeel SP300, but may alternatively be made of other materials, such as stainless steel or an aluminum alloy. The portion of the dies shaped to impart simulated sticking 230 to the composite material include surfaces having a draw angle θ, relative to the plane of the die (FIG. 5), which is sometimes referred to as the draft angle. The maximum draw angle possible for a given composite material and process may be increased by use of anti-bonding coatings according to the present disclosure, as compared with prior-art coatings. In one embodiment, door skins formed of a lignocellulosic composite with isocyanate-based resin such as pMDI using dies coated with an ormosil ceramic anti-bonding agent according to the present disclosure may have a draw angle of greater than 70 degrees, and in some embodiments greater than 75 degrees or greater than 78 degrees.

The presence of a low-friction and low-adhesion anti-bonding coating according to the present disclosure may enable the composite material of the mat to flow to some extent along the high draw angle contours of the die during pressing, to achieve improved distribution and density of composite material in the high draw angle regions 302 (FIG.

Figure 6:
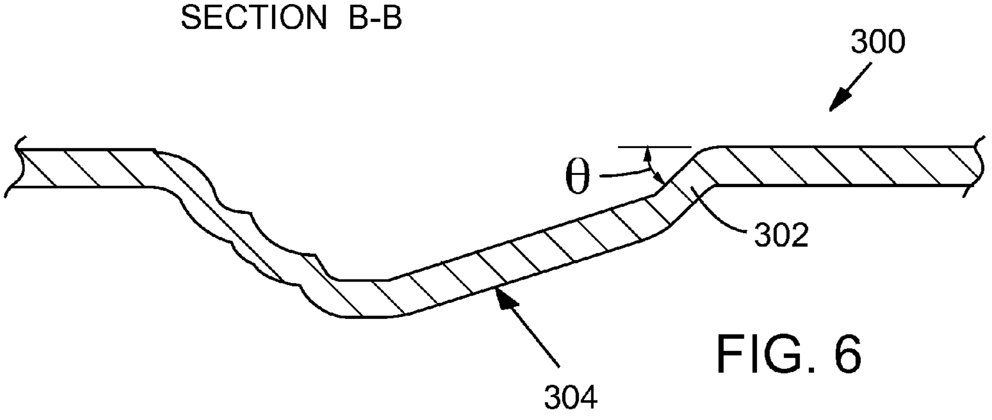
FIG. 6 is an enlarged cross section view of the sticking region of a door skin pressed in the die of FIGS. 3-5.

5) of the resulting composite product 300 (FIG. 6). For example, it is expected that the use of the anti-bonding coatings described herein may enable greater local stretch factors than prior art processes for manufacturing door skins or other articles made of the same type of fiber-reinforced composite materials, without sacrificing strength or appearance, which would allow a greater maximum vector angle for a given draw depth and/or a greater draw depth for a given vector angle, wherein the terms "local stretch factor" and "vector angle" and "draw depth" should be given substantially the same definitions as set forth in Patent Application Publication No. US 2005/0217206 A1. Likewise, enabling the composite material to flow, during the pressing operation, along the contours of the die in the region of sticking or other highly drawn features may inhibit or reduce the incidence of imperfections in the finished composite material, such as cracks, holes, and other visible imperfections that can otherwise be caused by excessive stretching.

To prepare dies 202 and 204 for coating, the working surfaces 206, 208 of the dies are first degreased with a caustic agent and hot water. One suitable caustic agent is Morado Super Cleaner sold by ZEP, Inc. of Atlanta, Ga. Next, the working surfaces 202, 204 are roughened by sandblasting or, preferably, blasting with an abrasive blast medium having a particle size finer than sand, such as fused alumina having a particle size in the range of approximately 60 microns to 125 microns, or about 80 grit. To promote adhesion of the anti-bonding coating, the working surfaces 202 and 204 are roughened to a roughness on the $R_a$ scale of approximately 2.0 to 6.0 microns and preferably about 3.0±0.5 microns. When roughening, care is taken to impart similar roughness to all contoured surfaces of the die, including the sticking. To properly roughen the sticking and other profiled surfaces, the grit is blasted perpendicularly to the surfaces, starting with the sticking and any other angled surfaces. After roughening, the dies are cleaned to remove grit. For example, the dies may be blown off with compressed air that has been filtered and passed through an oil separator to remove dirt and oil from the compressed air.

Sol-gel type anti-bonding coatings, such as Whitford FUSION, are generally transported and stored as a two-part coating systems that must be mixed, matured, and applied soon after the two liquid solutions are mixed and matured. The coating may be an admixture including a first component of a silane or oligomer thereof and a second component of colloidal silica including a substantial amount of silica nanoparticles. Some embodiments may involve an admixture of more than two components. In one embodiment, the first component includes methyltrimethoxysilane (MTMS), tetraethoxysilane (TEOS), or a mixture thereof. In one embodiment the first component comprises an approximately 2:1 weight ratio mixture of methyltrimethoxysilane to tetraethoxysilane. The second component may include at least 10% wt silica particles sized between 0.1 and 1.0 microns in an aqueous suspension. In one embodiment, the second component includes 20-50% wt silica nanoparticles and less than about 10% wt of functional fillers or additives, such as nanoparticles of metal oxides or hydrides and natural minerals or stone materials, such as one or more of those listed above. The size and type and amount of additives may be selected to yield a roughened surface finish, a matte finish having the texture of an egg shell, or a smooth finish, and may impart functional properties such as improved hydrophobicity, improved adhesion to the steel die substrate, improved hardness, toughness, abrasion resistance, and scratch resistance. Surface additives such as silicone surface additives or polyacrylate surface additives may be added to the second component to help with leveling and/or adhesion of the coating, and to inhibit the formation of craters in the coating. The silica sol may be activated by a dilute acid or alcohol, such as isopropyl alcohol between 1-5% wt in the second component.

In one embodiment, the first component may comprise a mixture of methyltrimethoxysilane ($CH_3Si(OCH_3)_3$), 0.0% to 5% inorganic pigments, and 5-15% alcohol (including any of isopropyl alcohol, ethyl alcohol or methyl alcohol, or a mixture thereof), and the second component may comprise 30-50% wt. colloidal silica mixed with 2-20% alcohol (including any of isopropyl alcohol, ethyl alcohol or methyl alcohol, or a mixture thereof), 0.1 to 5% titania nanoparticles, optionally 0.1 to 5% alumina nanoparticles, copper chromite black spinel, and/or other additives, and the balance water.

The maturing and curing process may involve a hydrolysis reaction (1):

(1)

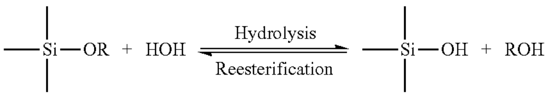

which is followed by a condensation reaction, as follows (2):

(2)

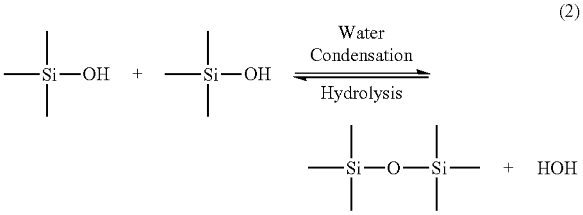

In an exemplary embodiment, before mixing the two components of the coating together, each is stirred or agitated well to ensure that solids and components are evenly distributed. In one example the components are each agitated using a drum roller (also known as a drum rotater) for approximately one hour. After agitation, the two liquid components are then mixed using a batch stirrer or mixer. Once mixed, the mixture is matured by agitating the mixture with a drum roller or paint shaker while exposing the drum to air temperature of approximately 100° F. to 108° F. (38-42° C.) for approximately three hours. In one embodiment, the mixture is matured by agitating with a drum roller or paint shaker while heating the mixture to about 104° F. (40° C.) for two hours, followed by an additional hour of agitation by the drum roller. The matured mixture may then be filtered through a screen having a mesh size of 300-400 micron to remove any large particles.

The die is pre-heated to approximately 86° F. to approximately 93° F. (30-34° C.), before applying the mixed and matured coating to the die surface. Several coats of the matured mixture are applied to the pre-heated die surface using a conventional spray gun, electrostatic spray, another technique used for painting, or another coating technique, to achieve a cured dry film thickness of approximately 25-80 microns (approximately 0.0010 to 0.0032 inches). In one embodiment, three coats of the matured mixture are applied to the die surface using a conventional spray gun to achieve a dry film thickness of approximately 35 to 60 microns (approximately 0.0014 to 0.0024 inches). The liquid mixture is preferably applied in an ambient environment of approximately 84° F. (29° C.) and a relative humidity of less than approximately 70%. The coated die is then baked to cure the coating and remove excess liquid.

To cure the coating, the die may be heated to a temperature in the range of approximately 375 to 660° F. (190-350° C.) as measured by a thermocouple placed along the side surface of the die. In one embodiment, the coating is cured by heating the die to a temperature of approximately 590 to 600° F. (310-315 C) as quickly as possible. In other embodiments, the die may be heated to a temperature in the range of approximately 385 to 660° F. or in the range of 450 to 650° F. or in the range of 550 to 620° F. The die may be heated in an air atmosphere or in an inert gas environment, in an oven or by conductive heating using a resistive electrical heater (hot plate) in contact with the outside surface of the die opposite the working surface. Alternatively, the die may be heated by an induction heating device. In some embodiments, an infrared-heating device positioned above the coated surface may be used in addition to or instead of a conductive heater, induction heater, or convection oven to reduce the curing time. Preferably the die is heated to the curing temperature as quickly as possible. However, the mass of the metal in the die will limit the rate of heating which is possible. With a resistive heater, it may take 60-120 minutes to heat the die to the necessary curing temperature. After heating it to the curing temperature, the coated die is cooled to room temperature (approximately 70° F. (21° C.)) in an air atmosphere or in an inert gas environment. In some embodiments, the die may be cooled by circulating liquid coolant through coolant pathways within the die. In other embodiments, the die may be cooled by blowing ambient air or inert gas over the surface of the die. In other embodiments, the die may be cooled by placing it on a cooling platen that has recirculating liquid coolant inside pathways within the platen. In other embodiments, the coating may cure at room temperature—a process which may take several days to complete.

After curing, the anti-bonding agent may exhibit a hardness of approximately 90 to 98 Shore D and an abrasion resistance of greater than 50,000 cycles, and in some embodiments greater than 100,000 cycles, as measured using BSI Standard No. BS 7069:1988, with a 4.5 kg force and 3M 7447 Scotch-Brite abrasive pad. In some embodiments, the anti-bonding coating may exhibit a hardness of greater than 80 Shore D, an abrasion resistance of greater than 50,000 cycles, and a scratch resistance of greater than 15 grams critical scratch loading (using a 90° diamond indenter, as described above). The anti-bonding coating is preferably hydrophobic, and in one embodiment, may exhibit an advancing water contact angle of approximately 100 to 105 degrees (ASTM D7334-08). In other embodiments, the coating may exhibit an advancing water contact angle of greater than 90 degrees, for example, 90 to 120 degrees, 100 to 150 degrees, or greater than 150 degrees (ASTM D7334-08). The coating may have a surface energy of less than approximately 30 $mJ/m^2$ total, including dispersive and polar components (Owens/Wendt theory), wherein the polar component is less than approximately 6 $mJ/m^2$. In other embodiments, the coating may have a total surface energy of less than approximately 25 $mJ/m^2$ or less than approximately 22 $mJ/m^2$, including a polar component of less than approximately 6 $mJ/m^2$ or less than approximately 2 $mJ/m^2$. Surface energy is calculated from contact angle measurements (sessile drop technique) for five liquids of known energy: Diidomethane, water ($H_2O$), dimethyl sulfoxide (DMSO), formamide, and ethylene glycol.

Anti-bonding coatings having an increased hardness and/or scratch resistance may retain their anti-masking properties significantly longer than prior art coatings. For example, dies coated in accordance with the coatings described herein may withstand 20,000 or more pressing cycles without exhibiting masking or coating failure.

The anti-bonding properties of the ormosil coatings described herein may over time degrade due to exposure to heat, abrasion, chemicals, or other environmental conditions, likely due to loss of alkyl or aryl groups from the ormosil network. Some embodiments of the ormosil coatings may be rejuvenated utilizing a rejuvenating treatment, such as a wipe-on surface treatment that can be applied on top of the ormosil coating while the die is still in the press, or after the die is removed from the press. Rejuvenating treatments may include treatment solutions including a silane or silanol such as trimethylsilanol, or a fluoroalkylsilane (FAS) system such as SIVO Clear™ K1/K2, a two-part ambient curing FAS system sold by Evonik Industries AG of Essen, Germany.

Anti-bonding coatings according to the present disclosure may also be applied to equipment other than dies that is used in the manufacture of fiber-reinforced composites. For example, the anti-bonding coating may be applied, using one of the above-described formulations, coating methods, and curing methods, to the working surfaces of machinery for mixing or conveying, such as blenders, blender casings, blowline piping, refiner discs, formers, hoppers, shavers, shave-off rollers, conveyor belts, pre-compress rollers, saws, and any other working surfaces exposed to resin or the composite mixture of fibers and resin, and especially metallic working surfaces. The anti-bonding coatings described herein may also be useful for preventing build-up of latex paint, or other paints, varnishes, or surface treatments, on the walls and other surfaces of painting booths and on the automated painting equipment used in such booths. For large objects and immovable surfaces such as painting booth walls, an ambient curing coating such as NIC Industries' MICROSLICK coating is desirable.

Visual observations of composite products made using anti-bonding coatings according to some of foregoing embodiments indicate that the use of anti-bonding coatings on the dies may yield composite materials with improved surface finish, increased gloss, decreased surface roughness, increased water resistance (as measured by increased water contact angles), reduced incidence of loose fibers at the composite surface, and improved edge sharpness and detail. For example, it is expected that a hard ceramic non-PTFE anti-bonding agent, such as Whitford FUSION, when applied to an edge feature on the die defined by an inside radius of 0.030 inch, may yield a pressed fiber composite panel having a corresponding outside edge feature having an outside radius of less than approximately 0.035 inch. Anti-bonding coatings according to the present disclosure may allow minimum die radiuses to be decreased, to yield composite parts having edges sharper than 0.030 inch radius, and in some cases sharper than 0.025 inch or sharper than 0.020 inch.

The following Examples demonstrate exemplary procedures that may be used to form a fiber composite door skin product using the anti-bonding coatings and methods described herein. While certain Examples are hypothetical in nature, they are based upon actual experimental designs that have been tested and/or contemplated.

Example 1

Die: Kleen-Kut 45

Coating: ILAG ILASOL, DFT=35-40 microns

Composite mixture:

~90% wt refined wood fiber dried to 14% wt moisture content 5.0% wt fiberglass filaments <0.1% wt wax 0.5% wt internal release agent 0.5% wt polyol 4% wt pMDI resin Die temperature=300° F. (149° C.)

Applied pressure=10 seconds at 800 psi, followed by 20 sec. at 250 psi

Expected functional life of coating: greater than 20,000 cycles

Example 2

Die: Industeel SP300

Coating: Thermolon ROCKS, DFT=40±5 microns

Composite mixture:

93.5% wt refined wood fiber dried to 10% wt moisture content

<0.1% wt wax 0.5% wt internal release agent

6% wt pMDI resin

Die temperature=300° F. (149° C.)

Applied pressure=10 seconds at 800 psi, followed by 20 sec. at 250 psi

Expected functional life of coating: greater than 30,000 cycles

Example 3

Die: Kleen-Kut 45

Coating: Whitford FUSION, DFT=25 microns

Composite mixture:

94.5% wt refined wood fiber dried to 10% wt moisture content

<0.1% wt wax 0.5% wt internal release agent

5% wt pMDI resin

Die temperature=300° F. (149° C.)

Applied pressure=10 seconds at 800 psi, followed by 20 sec. at 250 psi

Expected functional life of coating: greater than 10,000 cycles

Example 4

Die: Industeel SP300

Coating: NIC CERAKOTE Press Release, DFT=25-30 microns

Composite mixture:

~98% wt refined wood fiber dried to 10% wt moisture content

<0.2% wt wax 0.2% wt internal release agent 0.3% wt polyol 1.7% wt pMDI resin

Die temperature=300° F. (149° C.)

Applied pressure=10 seconds at 800 psi, followed by 20 sec. at 250 psi

Expected functional life of coating: greater than 10,000 cycles

Throughout this specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment.

Furthermore, the described features, structures, characteristics, and methods may be combined in any suitable manner in one or more embodiments. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Thus, it will be obvious to those having skill in the art that many changes may be made to the details of the above-described embodiments without departing from the underlying principles of the invention. The scope of the present invention should, therefore, be determined only by the following claims.

The invention claimed is:

1. A composite sheet material product pressed from a mat of fiber and resin, wherein the composite sheet material product has a sheet thickness of between 1 mm and 13 mm and the mat is contoured during pressing to form, in the pressed mat, at least one outside edge feature having an outside radius of less than 0.035 inch, and wherein the composite sheet material product is a door skin.

2. A composite sheet material product pressed from a mat of fiber and resin, wherein the composite sheet material product has a sheet thickness of between 1 mm and 13 mm and is contoured during pressing to form at least one angled surface having a draw angle greater than about 70 degrees, and wherein the composite sheet material product is a door skin.

3. The composite sheet material product of claim 1, wherein the mat of fiber is a mat of cellulosic fiber.

4. The composite sheet material product of claim 3, wherein the resin is an isocyanate-based resin.

5. The composite sheet material product of claim 1, wherein said at least one outside edge feature has an outside radius of less than 0.030 inch.

6. The composite sheet material product of claim 1, wherein said at least one outside edge feature has an outside radius of less than 0.025 inch.

7. The composite sheet material product of claim 1, wherein said at least one outside edge feature has an outside radius of less than 0.020 inch.

8. The composite sheet material product of claim 2, wherein the mat of fiber is a mat of cellulosic fiber.

9. The composite sheet material product of claim 8, wherein the resin is an isocyanate-based resin.

10. The composite sheet material product of claim 2, wherein the composite sheet material product is contoured during pressing to form at least one angled surface having a draw angle greater than about 75 degrees.

11. The composite sheet material product of claim 2, wherein the composite sheet material product is contoured during pressing to form at least one angled surface having a draw angle greater than about 78 degrees.

12. The composite sheet material product of claim 11, wherein the composite sheet material product is a door skin formed by inserting the mat between a pair of heated dies, at least one of which includes a working surface that forms the angled surface of the pressed composite material product, the working surface coated with an ormosil coating.

13. The composite sheet material product of claim 12, wherein the ormosil coating includes a cross-linked organically-modified silica network and has a hardness exceeding 6H pencil hardness, and the dies are heated to between 250 and 425 degrees Fahrenheit.

14. The composite sheet material product of claim 2, wherein the composite sheet material product is a door skin formed by inserting the mat between a pair of heated dies, at least one of which includes a working surface that forms the angled surface of the pressed composite material product, the working surface coated with an ormosil coating.

15. The composite sheet material product of claim 14, wherein the ormosil coating includes a cross-linked organically-modified silica network and has a hardness exceeding 6H pencil hardness, and the dies are heated to between 250 and 425 degrees Fahrenheit.

16. The composite sheet material product of claim 1, wherein the composite sheet material product is a door skin formed by inserting the mat between a pair of heated dies, at least one of which includes a working surface that forms the edge feature of the pressed composite material product, the working surface coated with an ormosil coating.

17. The composite sheet material product of claim 16, wherein the ormosil coating includes a cross-linked organically-modified silica network and has a hardness exceeding 6H pencil hardness, and the dies are heated to between 250 and 425 degrees Fahrenheit.

* * * * *